United States Patent [19]
Kataoka et al.

[11] Patent Number: 6,033,607
[45] Date of Patent: Mar. 7, 2000

[54] METHOD AND APPARATUS FOR MOLDING FIBER MIXTURE

[75] Inventors: Mitsunori Kataoka; Masanao Yamaguchi, both of Ibaraki; Takayasu Mori, Toyota, all of Japan

[73] Assignees: Teijin Limited, Osaka; Araco Kabushiki Kaisha, Aichi-Ken, both of Japan

[21] Appl. No.: 09/120,796

[22] Filed: Jul. 23, 1998

[30] Foreign Application Priority Data

Jul. 30, 1997 [JP] Japan ................................ 9-204435

[51] Int. Cl.⁷ .................................................... D04H 1/54
[52] U.S. Cl. ........................ 264/40.3; 264/517; 264/121; 264/122; 425/80.1
[58] Field of Search ................................. 264/40.3, 517, 264/121, 122; 425/80.1

[56] References Cited

U.S. PATENT DOCUMENTS

| | | | |
|---|---|---|---|
| 4,379,101 | 4/1983 | Smith | 264/40.3 |
| 5,108,691 | 4/1992 | Elliott | 264/554 |
| 5,378,296 | 1/1995 | Vesa | 425/80.1 |
| 5,571,465 | 11/1996 | Gill et al. | 264/121 |
| 5,587,121 | 12/1996 | Vesa | 264/126 |

FOREIGN PATENT DOCUMENTS

| | | |
|---|---|---|
| 0 596 476 | 5/1994 | European Pat. Off. . |
| 0 837 168 | 4/1998 | European Pat. Off. . |
| 5-345358 | 12/1993 | Japan . |
| 6-190160 | 7/1994 | Japan . |
| 6-192952 | 7/1994 | Japan . |
| 6-280149 | 10/1994 | Japan . |
| 7-222882 | 8/1995 | Japan . |
| 8-226055 | 9/1996 | Japan . |
| 9-84972 | 3/1997 | Japan . |
| 9-84973 | 3/1997 | Japan . |
| 9-85759 | 3/1997 | Japan . |
| 9-111628 | 4/1997 | Japan . |
| 9-176946 | 7/1997 | Japan . |
| WO 97 02377 | 1/1997 | WIPO . |

*Primary Examiner*—Mary Lynn Theisen
*Attorney, Agent, or Firm*—Sughrue, Mion, Zinn, Macpeak & Seas, PLLC

[57] ABSTRACT

A method and apparatus for molding a cushion member from a fiber mixture by a filling process comprising filling a fiber mixture composed of synthetic matrix fibers and binder fibers dispersed therein into a mold cavity of an air-permeable mold by a transportation air stream and a heat-treatment process comprising making a molding air stream for heating and/or cooling the fiber mixture filled in the mold cavity to pass through the fiber mixture, wherein a contact surface of the mold with the fiber mixture is divided into a plurality of contact sections, and a flow rate and/or pressure of an air stream passing through each of the contact sections are regulated to a predetermined condition so that the air stream in the mold cavity is differently controlled in the filling process and the heat-treatment process.

12 Claims, 11 Drawing Sheets

METHOD AND APPARATUS FOR MOLDING FIBER MIXTURE

BACKGROUND OF THE INVENTION

1. Field of the Invention

The present invention relates to a method and an apparatus for molding a cushion member from a fiber mixture which is a mixture of synthetic matrix fibers and binder fibers dispersed therein having a melting point lower than that of the matrix fiber (hereinafter referred to as "fiber mixture"), wherein the fiber mixture is filled in a mold cavity and heated therein. More specifically, the present invention relates to a method for molding a cushion member from a fiber mixture comprising the steps of filling the fiber mixture in a mold cavity formed by an air-permeable mold by a transportation air stream and finally passing a molding air stream for heating and/or cooling through the filled fiber mixture and an apparatus therefor.

2. Description of the Related Art

In general, a low cost urethane foam has widely been used for forming seat cushion members for automobiles or airplanes having a complicated configuration. However, the urethane foam has drawbacks in that a toxic gas is generated during combustion and a recycling is difficult, whereby substitute therefor has long been eagerly demanded.

To solve the above-mentioned problems, attention has recently been paid to a cushion member using the above-mentioned fiber mixture as a substitute for urethane foam. This cushion member has been formed by filling a fiber mixture into a mold cavity and heating the same to melt binder fibers contained in the fiber mixture to bond individual fibers composing the fiber mixture with each other.

Also, a method for producing a cushion member from a fiber mixture is proposed, for example, in Japanese Unexamined Patent Publication Nos. 2-95838 and 7-324266, wherein the fiber mixture is filled in a mold constructed from an air-permeable material while accompanied by a transportation air stream and hot air and cold air are made to flow through the fiber mixture filled in the mold cavity to mold the cushion member. This method has an advantage in that it is possible to quickly and uniformly heat-treat the cushion member because hot air and cold air are made to flow through the fiber mixture.

Figure 1A:
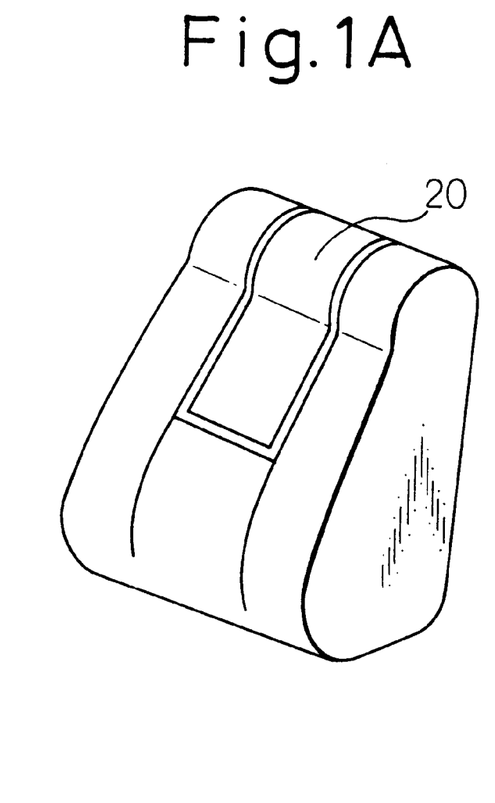
FIG. 1A is a front perspective view of the cushion member (20)
Figure 1B:
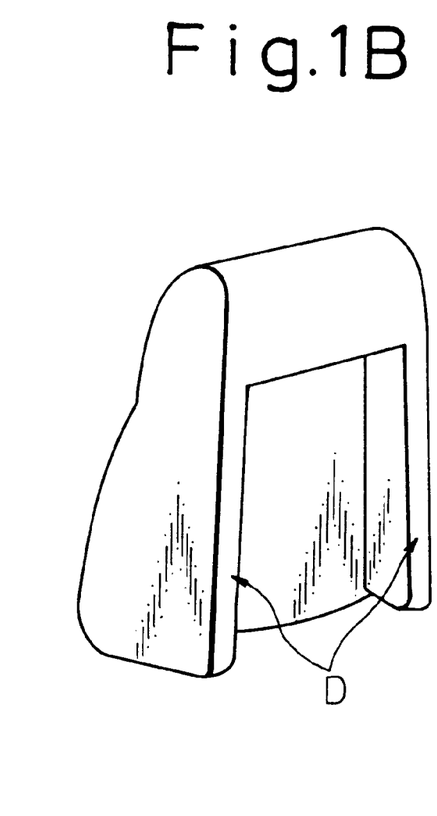
FIG. 1B is a back perspective view of the cushion member (20)
Figure 1C:
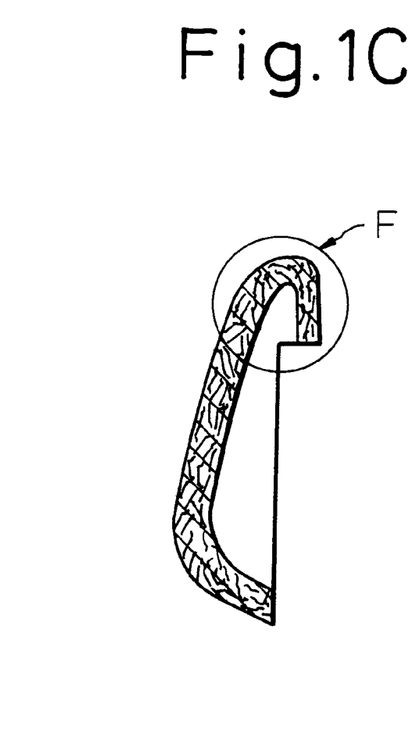
FIG. 1C is a side sectional view of the cushion member (20)

However, according to the above molding method, there is a problem in that a high quality cushion member is not obtainable if the cushion member has a complicated configuration as shown in FIG. 1 which is, for example, a backrest of a car seat, having a pouched structure F in the upper portion and an upright wall D on the respective side. This is because, a condition required for the transportation air stream in a process for filling the fiber mixture in the mold cavity while accompanied by the transportation air stream is different from that required for a molding air stream in a process for passing hot air and/or cold air through the fiber mixture (in this respect, "hot air and/or cold air" and "molding air stream" have the same meaning in the present invention). Details thereof will be described below.

In the process for filling the fiber mixture in the mold cavity, it is required that no void lacking the fiber mixture is generated within the mold cavity and the fiber mixture is filled at a predetermined bulk density. Accordingly, it is necessary to adapt the mold so that the transportation air stream for the fiber mixture more easily enters a portion of the mold cavity in which a void is liable to be generated. For this purpose, the air-permeability of the portion of the mold cavity in which a void is liable to be generated must be higher than in the other portion thereof.

Contrarily, in the heat-treatment process for passing the molding air stream through the fiber mixture filled in the mold cavity, it is required to uniformly pass the molding air stream through the mold filled with the fiber mixture so that no molding unevenness occurs in the resultant cushion member.

As is apparent from the above description, the behaviour of the air stream within the mold cavity is quite different between the filling process wherein the fiber mixture is gradually filled in the mold cavity and the heat-treatment process wherein the fiber mixture has already been filled in the mold cavity.

Further, usually, a shape of the mold cavity in the filling process is different from that in the heat-treatment process unless the molding condition is particularly unique. This is because that since the bulk density of the fiber mixture is low when the same is being filled, it is necessary to displace the mold in the compressive direction to compress tie fiber mixture to obtain a predetermined bulk density, which naturally results in the difference in the configuration of the molding cavity between the filling process and the heat-treatment process.

As stated above, the required behaviour of the air stream within the mold cavity is largely different between the filling process and the heat-treatment process in the configuration of the mold cavity, the flow resistance of the air stream through the fiber mixture, the flow path of the air stream or others. That is, the behaviour of the transportation air stream required for transporting the fiber mixture and that of the molding air stream required for converting the fiber mixture to the cushion member have different characteristics from each other. Thus, it is very difficult to obtain a high quality cushion member while avoiding a filling irregularity and/or the heat-treatment unevenness generated by the conventional molding method wherein the air-permeability of the mold is invariable between the filling process and the heat-treatment process in spite of such a large difference in the required characteristic between the both.

Such a fact causes a serious problem in a mass-production of the cushion member because a long time, for example, 30 minutes is necessary for slowly increasing and lowering the temperature of the fiber mixture to avoid the unevenness in the heat-treatment, which results in an excessively long molding time to slow mass-production and increase the molding cost.

To solve the above problem, there is a proposal in that a large amount of molding air stream is made to pass through the fiber mixture to improve the heat-transmission efficiency from the molding air stream to the fiber mixture. This method, however, requires a large flow rate of molding air stream which accompanies an increased air pressure. Accordingly, the fiber mixture which has been heated to lose its elasticity to some extent is liable to deform due to an influence of the large air pressure, whereby a thickness of the resultant product becomes thinner than the required thickness to deteriorate a quality of the cushion member.

To avoid this problem, it is also conceivable to accelerate the flow rate of hot air until the temperature of the binder fiber reaches a softening point and then decelerate the flow after the softening. During the cooling, cold air of a low flow rate is used while the fiber mixture is in a molten or softened state wherein the deformation thereof is liable to occur, which is then accelerated at the instant when deformation hardly occurs. Although this method is effective to some extent for shortening the processing time, it is impossible to largely reduce the heat-treatment time required for the heating/cooling process. Accordingly, it is extremely difficult to shorten the molding time of the cushion member, for example, to 5 minutes or less and it is impossible to reduce the molding cost by the mass-production while maintaining a high quality.

Also, according to a mold for molding a cushion member having a complicated configuration, such as a seat back as shown in FIG. 1 described above, the mold cavity to be filled with the fiber mixture also must have a correspondingly complicated configuration. Therefore, when the fiber mixture is filled in the mold cavity while accompanied by the transportation air stream, the behaviour of the transportation air stream within the mold cavity is difficult to control. Thus, it is extremely difficult to fill the fiber mixture in the mold cavity while stopping voids from being generated. Due to such a reason, it is very difficult to control the fiber mixture to be filled in the mold cavity in a desirable state.

SUMMARY OF THE INVENTION

To solve the above-mentioned problems in the prior art, an object of the present invention is to provide a method for molding a cushion member from a fiber mixture, free from a filling irregularity and a heat-treatment unevenness, even though the cushion member has a complicated configuration, as well as capable of reducing the molding time and having excellent productivity and quality.

As means for achieving the object of the present invention, a molding method is provided, wherein an air stream is separately controlled in the filling process and the heat-treatment process, by dividing a contact surface (mold wall) of a mold with a fiber mixture filled in a mold cavity into a plurality of contact sections, and varying a flow rate and/or a pressure of the air stream passing through the respective contact section (mold wall) in correspondence with predetermined conditions. Also, an apparatus for carrying out the above molding method is provided.

The control is carried out in such a manner that the air stream passing through the respective contact section (mold wall) is blown in or exhausted out to control the flow rate and/or the pressure of the air stream passing through the respective contact section in correspondence with a predetermined condition, or a flow rate of the transportation air stream passing through a contact section defining a mold cavity, wherein the fiber mixture is difficult to fill becomes selectively larger than that of the air stream passing through the other contact section.

Further, part or all of the contact sections (mold walls) is adapted to be individually movable in the direction for compressing the fiber mixture filled in the mold cavity, i.e., upward/downward, leftward/rightward or forward/backward, so that the bulk density of the fiber mixture filled in the mold cavity is adjustable to a desirable state in accordance with the required characteristics. Thereby, although the respective contact section (mold wall) is merely movable in the one-dimensional direction, the fiber mixture filled in the mold cavity can be compressed in the two or three-dimensional direction. In addition, it is possible to carry out such compression not only to all of the fiber mixture filled in the mold cavity but also to part thereof.

In such a manner, even in a mold cavity for molding a cushion member having a complicated configuration such as a backrest of a car seat or the like, it is possible to freely control the amount of the transportation air stream and/or the molding air stream passing through the contact section (mold wall). Moreover, it is also possible to partially control the bulk density of the fiber mixture filled in the mold cavity to a desired value. Therefore, it is possible to fill the fiber mixture in the mold cavity without generating a filling irregularity, whereby the unevenness of heat treatment is also eliminated when the fiber mixture is converted to the cushion member by the heat treatment. Thus, a molding method and an apparatus for carrying out the method, capable of reducing the molding time and resulting in a cushion member excellent in productivity and quality from a fiber mixture, are provided.

BRIEF DESCRIPTION OF THE DRAWINGS

FIGS. 1A, 1B and 1C are schematic illustrations of a cushion member (20) having a complicated configuration with a pouched structure (F) in the upper portion and an upright wall (D) on the respective side (for example, a backrest of a car seat), wherein

FIGS. 2A, 2B and 2C are schematic front sectional views, respectively, of a blow-in type apparatus according to the present invention for the molding of the fiber mixture, wherein

FIGS. 3A and 3B are schematic side sectional views, respectively, of a prior art apparatus for molding a cushion member having an upright wall structure, wherein

FIGS. 6A, 6B and 6C are schematic front sectional views, respectively, of an apparatus for molding a cushion member having a complicated structure such as a backrest of a car seat from a fiber mixture, wherein

FIGS. 7A and 7B are schematic front sectional views, respectively, of a prior art compression system for controlling the bulk density of a fiber mixture during the molding of a cushion member having a complicated structure, wherein

FIGS. 8A, 8B and 8C are schematic front sectional view, respectively, of a compression system for controlling the bulk density of a fiber mixture according to the present invention, wherein FIGS. 9A, 9B and 9C are schematic front sectional views, respectively, of three systems for uniformly filling a fiber mixture in a mold cavity while being accompanied by a transportation air stream, wherein

DESCRIPTION OF THE PREFERRED EMBODIMENTS

There is no restriction in synthetic fibrous materials for constituting matrix fibers of the "fiber mixture" according to the present invention, which may include staple fibers, for example, of polyethylene terephthalate, polybutylene terephthalate, polyhexamethylene terephthalate, polytetramethylene terephthalate, poly-1,4-dimethyl cyclohexane terephthalate, polypivalolacton, or copolymer esters thereof, mixtures of such staple fibers, or staple fibers of composite fiber (conjugate fiber) composed of two or more kinds of the above-mentioned polymer components. Also, a cross-sectional shape of the staple fiber may be either circular, flat, non-circular or hollow. The synthetic staple fiber preferably has crimps, particularly apparent crimps. The apparent crimps may be imparted by a mechanical method such as a crimper, by an anisotropic quenching during the spinning or by a heat-treatment of a composite fiber such as a side-by-side type or an eccentric sheath/core type.

On the other hand, as a binder fiber, polyurethane type or polyester type elastomer fibers may be used. Particularly, a composite fiber on which surface is exposed such elastomers are preferably used. In this regard, the binder fibers are, of course, dispersed and mixed in the above-mentioned matrix fibers at a ratio in correspondence to the required performance of the resultant molded product.

The preferred embodiments of the present invention will be described below in detail together with the operation thereof with reference to the attached drawings.

Figure 2A:
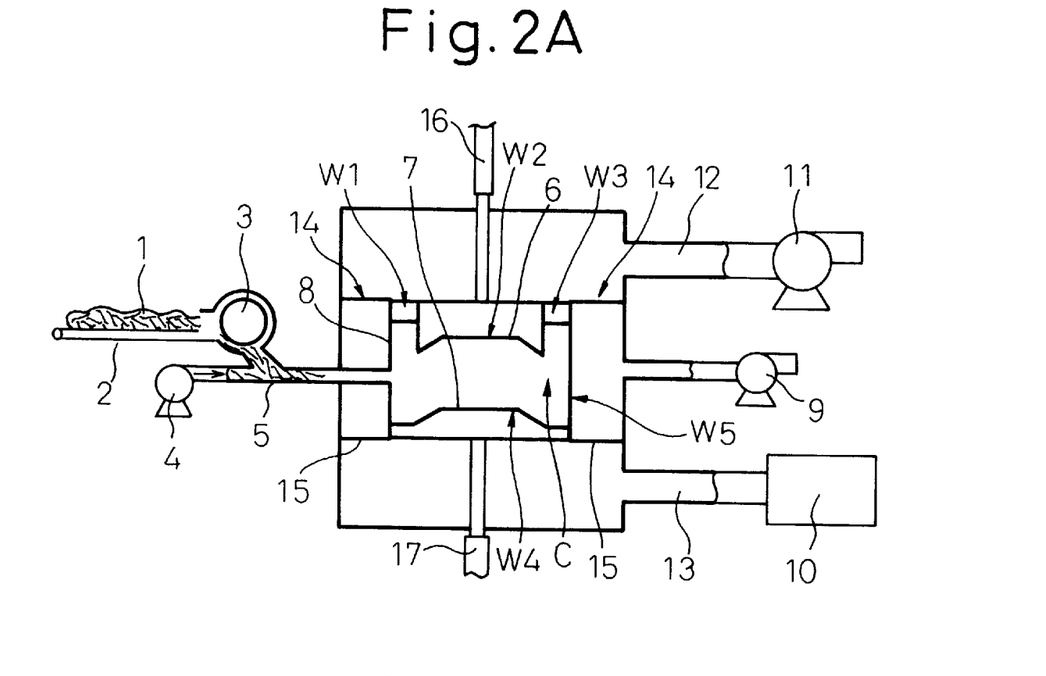
FIG. 2A illustrates a state immediately before blowing the fiber mixture into the mold cavity.
Figure 2B:
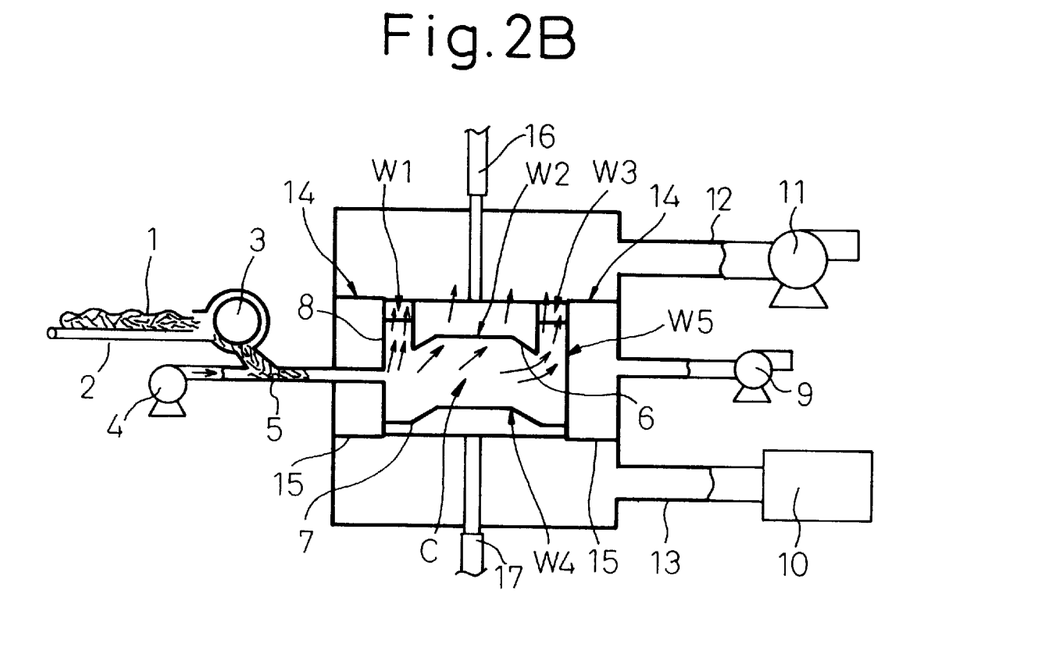
FIG. 2B is an initial stage of the filling of the fiber mixture by a transportation air stream.
Figure 2C:
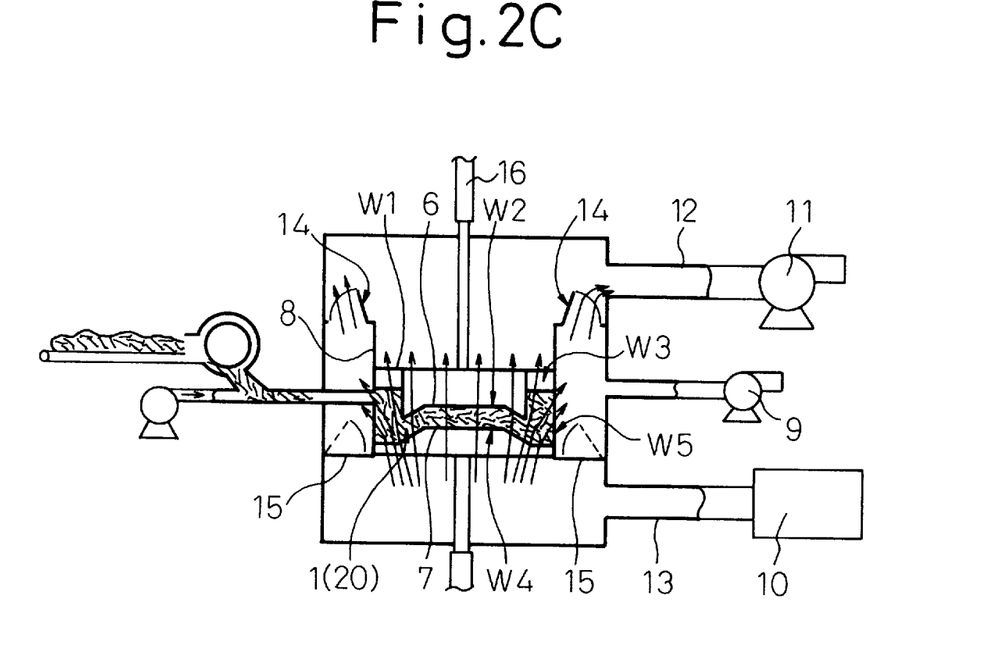
FIG. 2C illustrates a state of a molding air stream for converting the fiber mixture into the cushion member.

FIGS. 2A to 2C is a front sectional view of an apparatus for carrying out the method according to the present invention; that is, an apparatus for molding a cushion member from a fiber mixture by an air-blowing system.

In these drawings, reference numeral 1 denotes a fiber mixture; 2 a conveyor; 3 a fiber-opener; 4 a blower; and 5 a duct, respectively. By employing such an arrangement, it is possible to blow the fiber mixture 1 into a mold cavity C for the fiber mixture 1 by a transportation air stream. That is, the fiber mixture 1 is supplied onto the conveyor 2, and, after being loosened by the fiber opener 3, further supplied to the mold cavity C via the duct 5 while being accompanied with the transportation air stream generated by the blower 4.

The mold cavity C is defined by an interior area encircled by an upper mold 6, a lower mold 7 and side molds 8. In this regard, the upper mold 6 and the lower mold 7 are formed of an air-permeable material such as a punched plate, a metallic net or a porous plate of sintered metal. The upper mold 6 and the lower mold 7 are individually movable while sliding on the inner wall surface of the side molds 8 formed of an air-permeable material similar to the former. Reference numeral 9 or 11 denotes an exhauster; 10 a blower; 12 an exhaust pipe; and 14 or 15 a pair of openable damper provided in the upper or lower portion; wherein the behaviour of the air stream passing through the respective contact section (mold wall) W1 to W5 is controlled by these devices.

The upper mold 6 and the lower mold 7 are independently and/or dependently movable in the direction for compressing the fiber mixture filled in the mold cavity C (upward and downward in the embodiment shown in FIGS. 2A to 2C) by the action of actuators 16 and 17, respectively. In this regard, the actuator 16 or 17 is preferably a fluid pressure cylinder using oil pressure, hydraulic pressure or pneumatic pressure, but may be a conventional electromotive linear motion device. In short, it is important that the actuator has a function for displacing the upper mold 6 and the lower mold 7 in the direction for compressing the fiber mixture 1.

The present invention is characterized in that a contact surface of the molds 6 and 7 with the fiber mixture 1 filled in the mold cavity is divided into a plurality of contact sections W1 to W5 and a flow rate and/or pressure (dynamic pressure and static pressure) of an air stream passing through the respective contact section is adjusted to a predetermined condition, whereby the air stream in the mold cavity C is controlled as a whole. For this purpose, there are three contact sections W1 to W3 in the upper mold 6 shown in FIG. 2, while two contact sections W4 and W5 in the lower mold 7 and the side mold 8, respectively.

In this regard, the respective contact section W1 to W5 are mold walls to be in contact with the fiber mixture 1. In the embodiment shown in FIG. 2, each of the lower mold 7 and the side mold 8 has one contact section W4 or W5, respectively. In such a manner, there may be only one contact section as in the lower mold 7 having the contact section W4 or a plurality of contact sections as in the upper mold 6 having three contact sections W1 to W3. In this regard, in a case wherein a plurality of contact sections are provided, it is possible to more finely control the behaviour of the air stream passing through the contact surface compared with a case wherein only one contact section is provided, so that the molding condition is more precisely determined.

The contact sections W1 to W5 thus divided are adapted to be movable in the direction for compressing the fiber mixture 1 as one group per mold, i.e., in the embodiment shown in FIG. 2, W1 to W3 in the upper mold 6, and W4 in the lower mold 7. However, as in an embodiment described later, the contact sections W1 to W5 may be individually movable.

With reference to the apparatus shown in FIGS. 2A and 2B, the method and apparatus according to the present invention will be described below in more detail, while being classified into a filling process and a heat-treatment process. First, FIG. 2A illustrates a state immediately before the fiber mixture is blown into the mold cavity. In this state, an interior area of the mold cavity C is larger than in a state shown in FIG. 2C wherein a cushion member 20 is being molded. The reason why the interior area of the mold cavity C is preliminarily enlarged is that a required bulk density (filling density) is not obtainable when the fiber mixture 1 is converted to the cushion member 20 solely by blowing the fiber mixture into the mold cavity by the transportation air stream. To obtain the desirable bulk density, it is necessary to compress the fiber mixture 1 filled in the mold cavity C by the blowing.

Next, FIG. 2B illustrates a favorable behaviour of the transportation air stream during the process for filling the fiber mixture 1 by the blowing, wherein the transportation air stream is controlled to flow in the arrowed direction. In this drawing, the dampers 14, 15 provided in the upper and lower portions are closed. If the exhausters 9 and 11 are operated in this state, the transportation air stream is controlled to flow in the arrowed direction.

In this case, the air-permeability of the respective contact sections W1 to W5 in the respective molds 6 to 8 may be individually differentiated. That is, with reference to FIG. 2A, the air-permeability of the contact sections W1 and W3 corresponding to portions of the mold cavity C through which the transportation air stream is difficult to pass is larger than that of the contact sections W2, W4 and W5 corresponding to portions of the mold cavity C through which the transportation air stream is easy to pass. Accordingly, it is possible to fill the fiber mixture 1 even in a portion of the mold cavity C to which the fiber mixture 1 is difficult to enter, whereby the generation of a void is prevented.

In this respect, the air-permeability of the mold is freely determined, for example, by varying the number and/or size of holes opening in the mold.

The behaviour of the transportation air stream in the filling process will be described in more detail below with reference to FIG. 2B.

The fiber mixture 1 is not sufficiently filled in deeper portions of the mold cavity C having the contact sections W1 and W3 wherein the fiber mixture 1 is in contact with the upper mold 6. Therefore, it is necessary for the purpose of sufficiently supplying the fiber mixture 1 even to such portions to increase a flow rate (exhaust rate) through the contact sections W1 and W3 so that the transportation air stream for the fiber mixture 1 is sufficiently exhausted from the contact sections W1 and W3.

To achieve the above object, it is necessary to control a flow rate and/or a pressure (dynamic pressure and static pressure) of the transportation air stream to a predetermined condition so that the transportation air stream flows in the arrowed direction in FIG. 2B. This control is carried out by closing the dampers 14 and 15 as shown in FIG. 2B and operating the exhauster 11 in this state to exhaust the transportation air stream upward from the upper mold 6. It is important at this time that the upper and lower dampers 14 and 15 are maintained in a closed state to prevent the transportation air stream from excessively being exhausted through the contact section W5 wherein the side mold 8 is in contact with the fiber mixture 1, whereby the pressure (static pressure and dynamic pressure) in the respective contact section varies and the flow rate of the transportation air stream increases or decreases to sufficiently fill the fiber mixture 1 in the deeper portions of the mold cavity defined by the contact sections W1 and W3.

When the fiber mixture 1 has been sufficiently filled in the deeper portions of the mold cavity defined by the contact sections W1 and W3, the exhauster 9 disposed opposite to a position at which the duct 5 is opened is operated, whereby the fiber mixture 1 is sequentially filled in the mold cavity C starting from a portion closer to the exhauster 9. Thus the filling of the fiber mixture into the mold cavity C is completed. In such a manner, the transportation air stream is controlled to an optimum state so that no filling irregularity of the fiber mixture 1 is generated in the mold cavity C.

In the filling process described above, the flow rate and/or pressure (dynamic pressure and static pressure) of the transportation air stream is controllable to a predetermined condition not only by the closing/opening of the dampers 14 and 15 but also by the adjustment of the exhaust rate or exhaust pressure of the exhausters 9 and 11. Also the air-permeability of the upper mold 6 in the contact sections W1 to W3, the lower mold 7 in the contact section W4 and the side mold 8 in the contact section W5 is preferably adjusted to the respective condition while varying a porosity of the molds as stated before.

The fiber mixture 1 completely filled in the mold cavity C as stated above is then compressed as shown in FIG. 2C by the upper mold 6 and the lower mold 7 to have a desirable bulk density for the cushion member 20. In FIG. 2C, while the upper mold 6 is solely displaced in the direction for compressing the fiber mixture 1, it is, of course, possible to carry out the compression by the displacement of the lower mold 7.

Finally, the fiber mixture 1 is converted to the cushion member 20 through the heat treatment. FIG. 2C illustrates a favorable behaviour of the molding air stream passing through the compressed fiber mixture 1 in the heat-treatment process.

In this regard, the upper mold 6 may be constructed from a plurality of parts corresponding to the contact sections W1 to W3, and when the compression is carried out by the displacement of the upper mold 6, the respective contact sections W1 to W3 may be independently displaced downward. By such a divided type mold, it is possible to impart different portions of the fiber mixture 1 with different bulkiness densities by varying the degree of compression by the respective contact section. In addition, it is also necessary to solve the shrinkage problem in the thermal molding in that the resultant cushion member 20 does not have a predetermined dimension due to the shrinkage during the heat-treatment process. For this purpose, the compression of the fiber mixture 1 may be carried out not only before the initiation of heat-treatment process but also during or after the heat treatment in a multi-stage manner. Such a multistage compressive heat treatment is effective for obtaining a cushion member 20 excellent in dimensional stability.

The fiber mixture 1 compressed to have a predetermined bulk density as described above is then subjected to a heat-treatment process including a heating step and a cooling step. The heating step is a process for passing a hot air through the fiber mixture 1 and melting the binder fibers in the fiber mixture 1 to adhere the fibers of the fiber mixture 1 with each other by the molten binder fibers functioned as an adhesive. The cooling step is a process for passing a cooling air through the fiber mixture 1 and solidifying the molten binder fibers to firmly bond the fibers with each other. The fiber mixture 1 is converted to the cushion member 20 shaped to have an accurate configuration of the mold via these two steps.

According to the method and apparatus of the present invention, it is possible to control the molding air stream passing through the fiber mixture 1 in the heat-treatment process, wherein the behaviour required as the molding air stream is different from that for the transportation air stream as repeatedly stated hereinbefore. To carry out such a control, of course, the degree of freedom is preferably as large as possible, for controlling the flow behaviour of the transportation air stream and the molding air stream. Therefore, it is favorable for the purpose of obtaining a sufficient degree of freedom for the control to cross the direction the transportation air stream for blowing the fiber mixture 1 into the mold cavity C in the filling process generally in perpendicular to the direction of the molding air stream blowing into the mold cavity C in the heat-treatment process.

In the heat-treatment process, part of the fiber mixture 1 is piled to have a larger height and a smaller width in a side area along the side wall of the side mold 8, i.e., the side surface of the mold cavity C, compared with a residual part piled in a central area of the mold cavity C, as shown in FIG. 2C. Accordingly, when the molding air stream flows upward/downward through the fiber mixture 1, there is a problem in that it is liable to deviate from the side area to the central area due to the difference in through-flow resistance between the side area and the central area whereby the molding air stream does not sufficiently pass through the part of the fiber mixture 1 piled in the side area of the mold cavity C in comparison with the part of the fiber mixture 1 piled in the central area. Particularly, the heat treatment of the fiber mixture 1 present on the contact section W5 wherein the side mold 8 is in contact with the fiber mixture 1 becomes insufficient because the molding air stream does not pass through the contact section W5.

This problem can be solved if it is adapted that the molding air stream flows not only through the contact sections W1 to W3 but also through the contact section W5 wherein the side mold 8 is in contact with the fiber mixture 1. That is, means for controlling a flow rate of the molding air stream is provided so that the molding air stream flows through generally all over the contact sections W1 to W5. In the method and apparatus according to the present invention, the upper damper 14 is opened and the lower damper 15 is closed for this purpose as shown in FIG. 2C. Thereby, the molding air stream is controlled to flow in the arrowed direction shown in FIG. 2C. In this case, the molding air stream controlled to have a predetermined temperature by a heat exchanger not shown is made to pass through the fiber mixture 1 by the blower 10 from the lower side to the upper side. Since the upper damper 14 is opened and the lower damper 15 is closed at this time, the molding air stream is exhausted not only from the contact sections W1 to W3 wherein the upper mold 6 is in contact with the fiber mixture 1 but also from the contact section W5 wherein the side mold 8 is in contact with the fiber mixture 1 by the exhauster 11.

As other means for controlling the air stream, a computer may be used, to which is stored the optimum condition of flow rate preliminarily obtained by experiments for the purpose of controlling the flow rate of the molding air stream flowing through the contact sections W1 to W5 to a desirable value. Based thereon, in a preferable aspect, the flow rate of the blower 10 and that of the exhauster 11 are controlled by changing the rotational speed of motors for the blower 10 and the exhauster 11 via a suitable control means such as an inverter so that the transportation air stream and the molding air stream are controlled. An air stream control means such as a flow rate control valve or a damper may be provided in the exhaust pipe 12 and the blower pipe 13 to control the flow rate of the molding air stream to a desirable value.

While the upper damper 14 is opened and the lower damper 15 is closed in the above-mentioned embodiment, the upper damper 14 may be closed and instead the lower damper 15 may be opened (as shown in FIG. 2C by a broken line) to pass the molding air stream through the contact section W5 wherein the side mold 8 is in contact with the fiber mixture 1. In this case, however, the molding air stream is reversed in direction to that in the aforesaid embodiment wherein the molding air stream is exhausted from the contact section W4, and flows into the fiber mixture 1 from the contact section W4.

According to a further aspect of the present invention, the mold is divided into a plurality of parts corresponding to the respective contact sections W1 to W5, each of which is provided with a chamber for adjusting the molding air stream to which is individually connected a blow/exhaust duct, so that the flow rate and pressure of the air stream in the chamber is controllable in correspondence with the respective blow/exhaust duct. The ducts connected to the contact sections W1 to W3 movable upward/downward must be a flexible duct such as a shrinkable/extendable bellows or a telescopic duct.

The cushion member 20 obtained via the heating and cooling steps in such a manner is removed from the side mold 8 by displacing the actuators 16 and 17 downward, and after being demolded from the upper mold 6 by the upward movement thereof, withdrawn from the molding chamber.

Figure 3A:
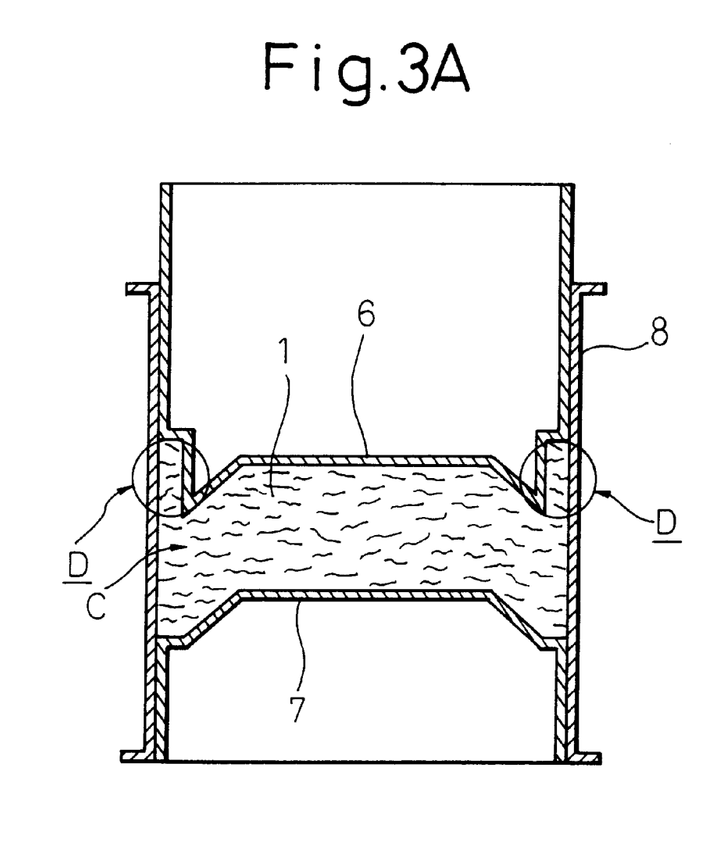
FIG. 3A illustrates a state wherein the blowing-in of the fiber mixture into the mold cavity has been completed.
Figure 3B:
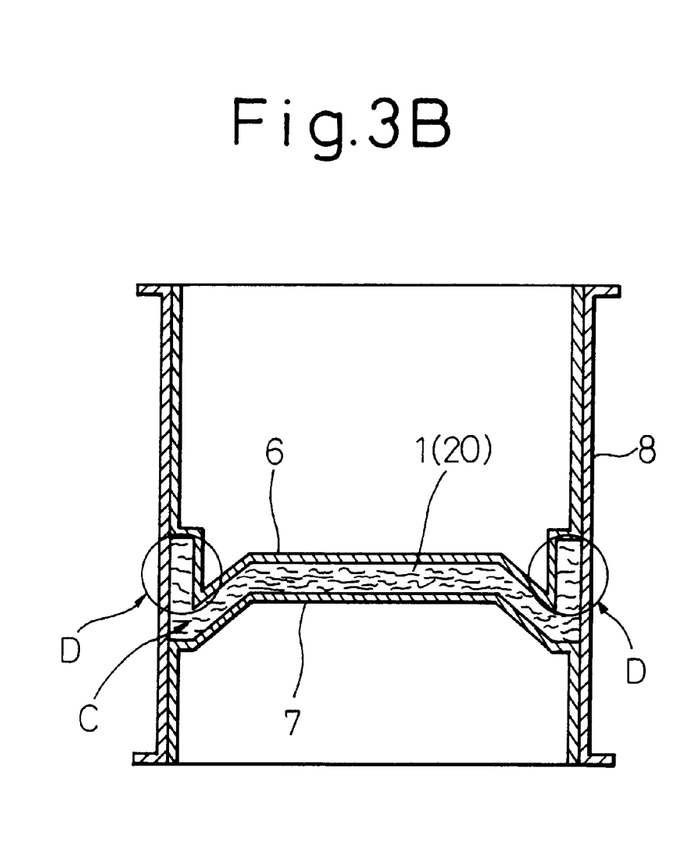
FIG. 3B illustrates a state wherein the compression of the fiber mixture has been completed.
Figure 4:
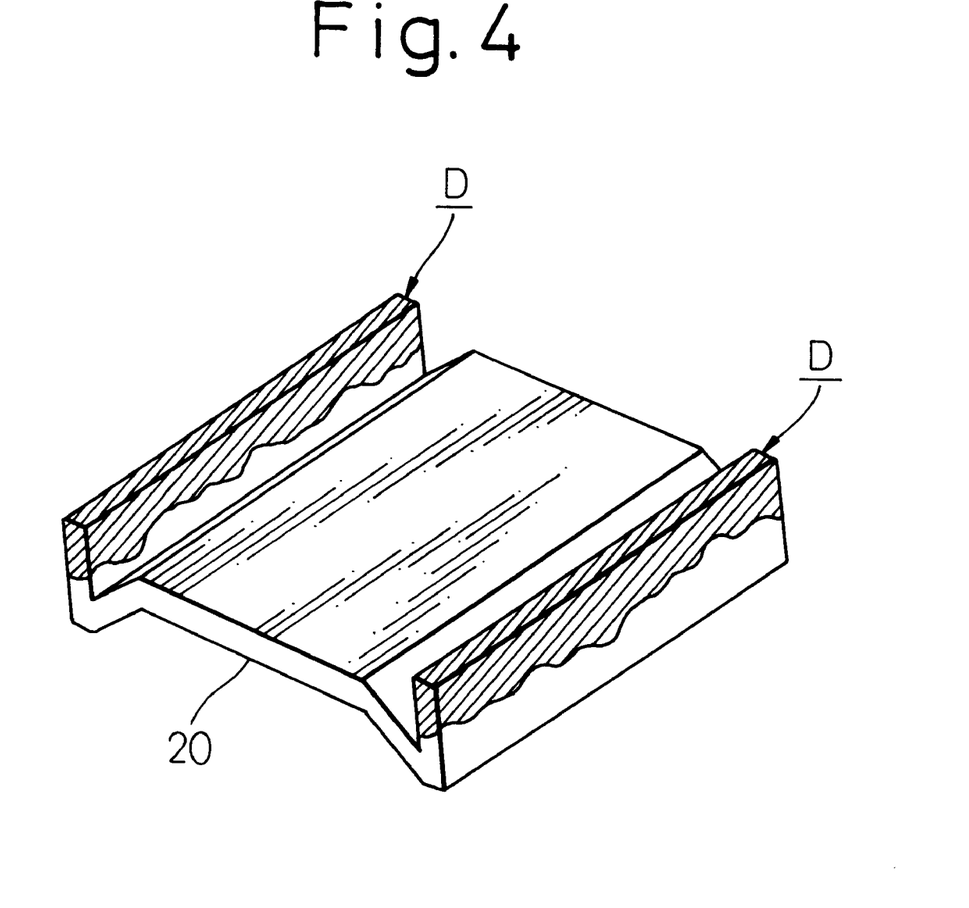
FIG. 4 is a perspective view of a cushion member obtained by the prior art shown in FIGS. 3A and 3B.

FIGS. 3A and 3B are side sectional views, respectively, of a mold for schematically explaining a prior art method for compressing a fiber mixture 1 for obtaining a cushion member 20 having an upright wall structure D shown in FIG. 4.

In this prior method, it is difficult to properly control the bulk density of the fiber mixture 1 in correspondence with the requirements for the respective portions. Particularly, it is difficult to uniformly fill the fiber mixture 1 in the mold cavity C (an area encircled by the upper mold 6, the lower mold 7 and the side mold 8) having a narrow upright wall portion D shown in FIG. 4, without the lack of fiber mixture 1 in the upright wall portion D. To solve such a problem, the above-mentioned method and apparatus according to the present invention are required.

Even if the fiber mixture 1 could be filled in the upright wall portion D without a lack of fiber mixture, according to the prior art method wherein the upper mold 6 is displaced downward to compress the filled fiber mixture 1 in the upward/downward direction, it is difficult to control the bulk density to a required value as a whole because the compression of the upright wall portion D becomes insufficient relative to other portions. Therefore, as shown in FIG. 4, it is impossible to impart a predetermined hardness to the upright wall structure D of the cushion member 20, obtained after the completion of the thermal molding, corresponding to the portion D of the mold cavity C (hatched area in the drawing).

Figure 5A:
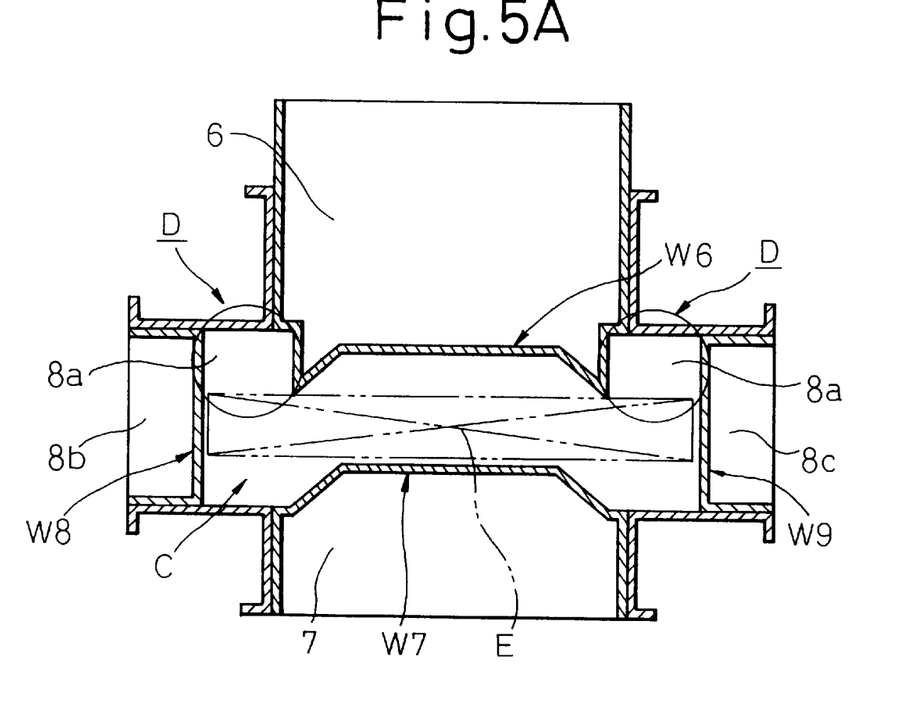
FIGS. 5A and 5B are schematic side sectional views, respectively, of an apparatus for molding a cushion member having an upright wall structure from a fiber mixture according to the present invention, by the lateral compression.
Figure 5B:
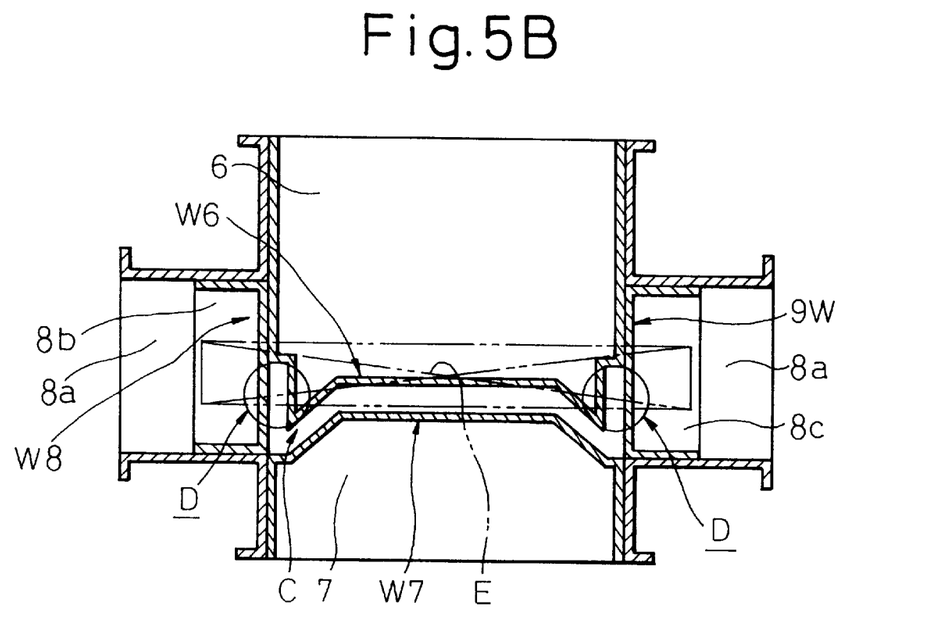

To solve the drawback in the prior art method, an apparatus and method according to the present invention shown in FIGS. 5A and 5B are required. In the same manner as in FIGS. 2A to 2C, reference numeral 6 denotes an upper mold; 7 a lower mold; and 8a to 8b a side mold 8, respectively, wherein the side mold 8 includes a main body 8a, a lefthand member 8b and a righthand member 8c. Reference numeral E indicated by a two-dot chain line (imaginary line) denotes an air-blowing inlet. In this regard, there is a premise in FIG. 5 in that the fiber mixture has already been filled in the mold cavity C and a profile of the fiber mixture is eliminated for clarifying the drawing.

The side mold 8 itself also constitutes side molds disposed on front and back sides (as seen in the direction vertical to a plane of FIGS. 5A and 5B). The mold cavity C is defined by an area encircled by the upper mold 6, the lower mold 7 and the side mold 8. Further, the upper mold 6 and/or the lower mold 7 are movable upward and downward to be capable of compressing the fiber mixture filled in the mold cavity C. The lefthand member 8b and the righthand member 8b are movable leftward and rightward, respectively, to be capable of compressing the fiber mixture filled in the mold cavity C in the leftward/rightward direction. W6 to W8 denote contact sections wherein the mold is in contact with the fiber mixture as in FIG. 2.

Small lumps of fiber mixture are filled in the mold cavity while being accompanied by the transportation air stream generated from a blower or others (not shown) through the air-blowing inlet E indicated by a two-dot chain line.

In the illustrated embodiment, the air-blowing inlet E is provided on the front side or rear side of the main body 8a of the side mold to open to the main body 8a. The portion D of the mold cavity C corresponding to the upright structure D of the cushion member 20 is widened to a great extent by the leftward and rightward displacement of the lefthand member 8b and the righthand member 8c, respectively.

Thereby, contrarily to the prior art method wherein the mold cavity C has a narrow upright wall portion D as shown in FIGS. 3A and 3B, according to the method and apparatus of the present invention, it is possible to guarantee a wide path for the transportation air stream. Further, as shown in FIGS. 5A and 5B, it is also possible to provide the air-blowing inlet E as wide as the full width of the mold cavity C widened by the lateral displacement of the side mold, contrary to a case wherein the side wall immobile in the lateral direction is used. Due to these reasons, the transportation air stream is fully introduced into the portion D of the mold cavity C to sufficiently fill the fiber mixture in the portion D of the mold cavity C without voids.

When the fiber mixture has been packed in the mold cavity C in such a manner, the fiber mixture is compressed to be in a shape shown in FIGS. 2A to 2C so that the predetermined bulk density is obtained in the fiber mixture. The method and apparatus of the present invention are characterized in that the filled fiber mixture is compressed in the compression process not only in the upward/downward direction but also in the lateral direction (forward/backward and/or leftward/rightward). That is, the fiber mixture 1 filled in the mold cavity C is compressed in the two-dimensional direction or the three-dimensional direction. According to the above method and apparatus, it is possible for the first time to control the bulk density of the fiber mixture to the predetermined value in the forward and backward direction as well as in the leftward and rightward direction. That is, instead of the prior art method wherein the fiber mixture 1 filled in the mold cavity C is compressed in the one-dimensional direction, according to the present invention, the fiber mixture 1 is compressed in the two or three-dimensional direction, whereby the bulk density of the fiber mixture is truly controllable to a desirable value. Thus, even in the mold cavity C having the portion D elongated in the upward and downward direction, the control of the bulk density which is not achievable at all solely by the compression in the upward and downward direction becomes possible by the addition of the lateral compression.

The configuration of the mold cavity C in an enlarged state may be determined to be an optimum one based on that of the mold cavity C when the final cushion member 20 has been obtained, while taking the required hardness/softness, air-permeability or others, of various portions of the cushion member 20, into account.

Figure 8A:
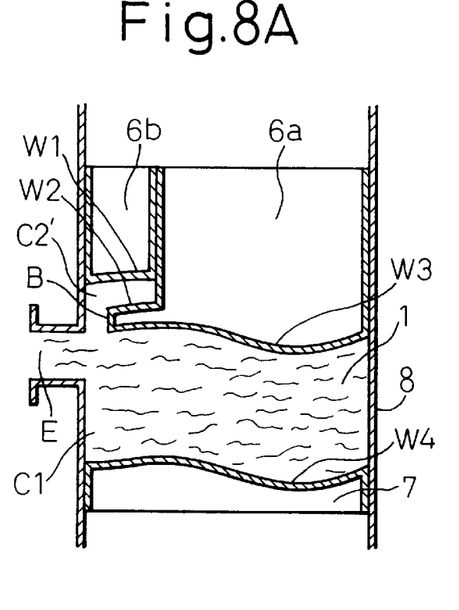
FIG. 8A illustrates a first step for filling the fiber mixture in the mold cavity.
Figure 8B:
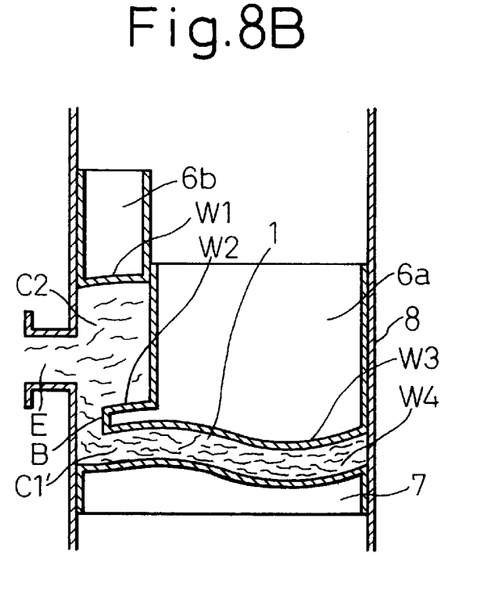
FIG. 8B illustrates a second step for filling the fiber mixture in the mold cavity after the first step has been completed and a compression has been partially carried out.

Finally, details of one of characteristics of the present invention will be described in detail with reference to FIGS. 6A to 6C; FIGS. 8A and 8B; and FIGS. 9A to 9C, when applied to the pouched structure F provided in the upper portion shown in FIGS. 1A to 1C. In these drawings, the same reference numerals are used for denoting the same or similar parts as in FIGS. 2A to 2C, with the exception that reference numerals 10 and 11 in FIGS. 6A to 6C are different from those in FIGS. 2A to 2C, but denote blower/exhauster for the molding air stream.

Figure 6A:
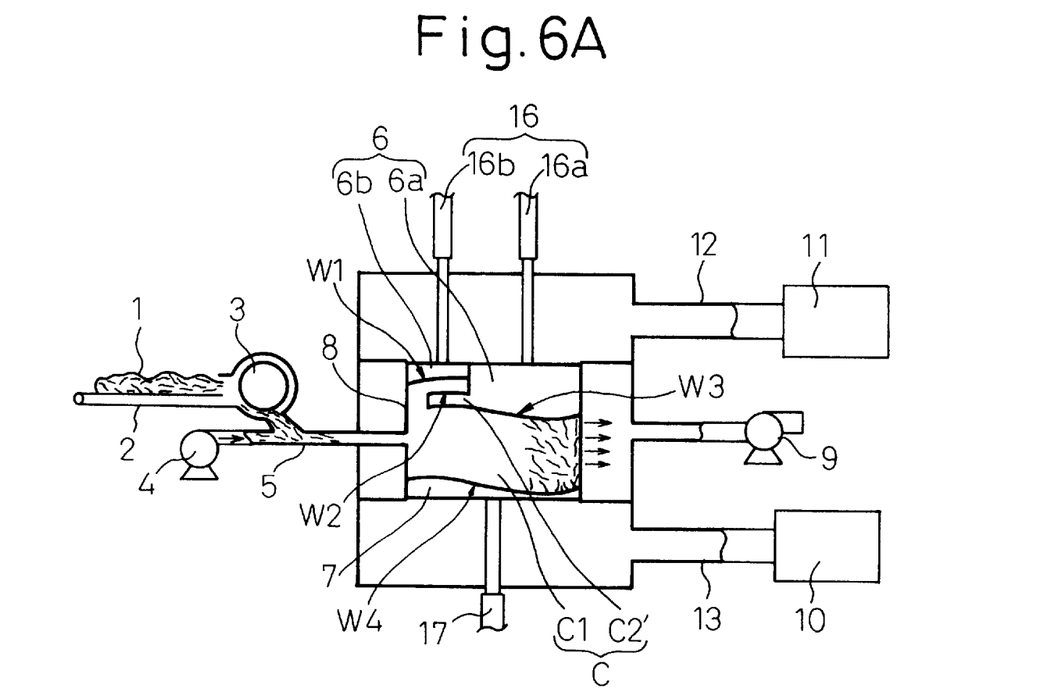
FIG. 6A illustrates a filling process wherein the fiber mixture is filled in a mold cavity.
Figure 6B:
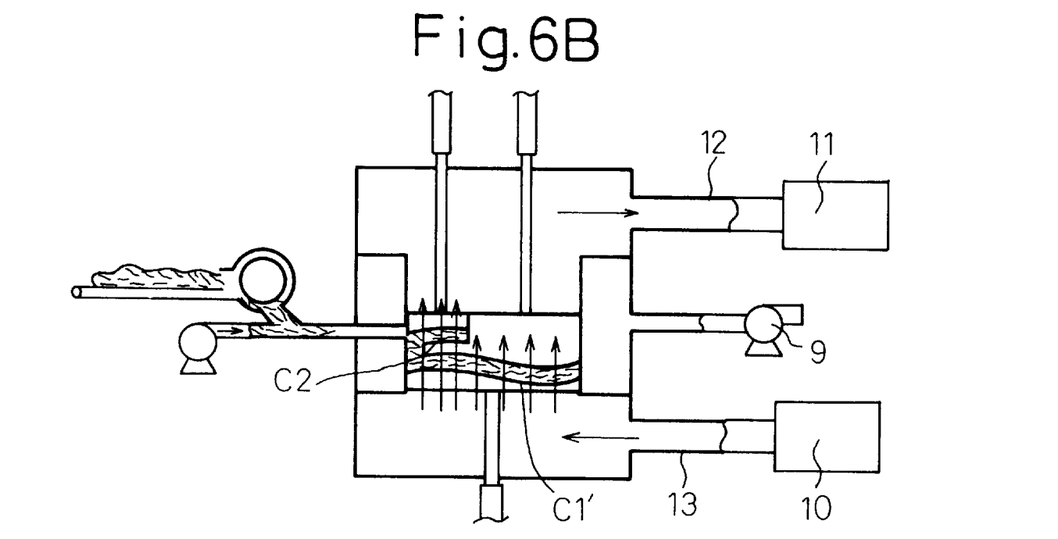
FIGS. 6B and 6C illustrate a heat-treatment process wherein the blowing direction of a molding air stream into the mold cavity is reversed in each of the drawings.
Figure 6C:
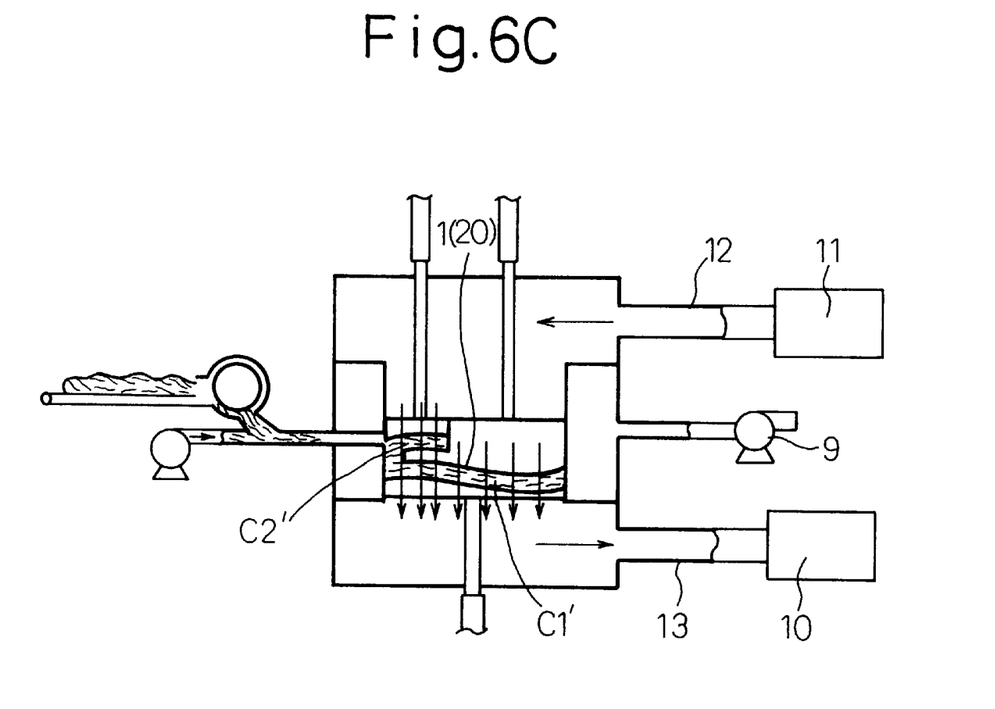

In FIGS. 6A to 6C, a mold cavity C is defined by a space encircled by a side mold 8, an upper mold 6 and a lower mold 7. That is, in FIGS. 6A to 9C, the mold cavity C consists of filling spaces C1, C1', C2 and C2' for filling a fiber mixture. In this regard, the filling space C1 or C1', or C2 or C2' forms a unit filling space extending in the direction for blowing-in the fiber mixture.

Figure 7A:
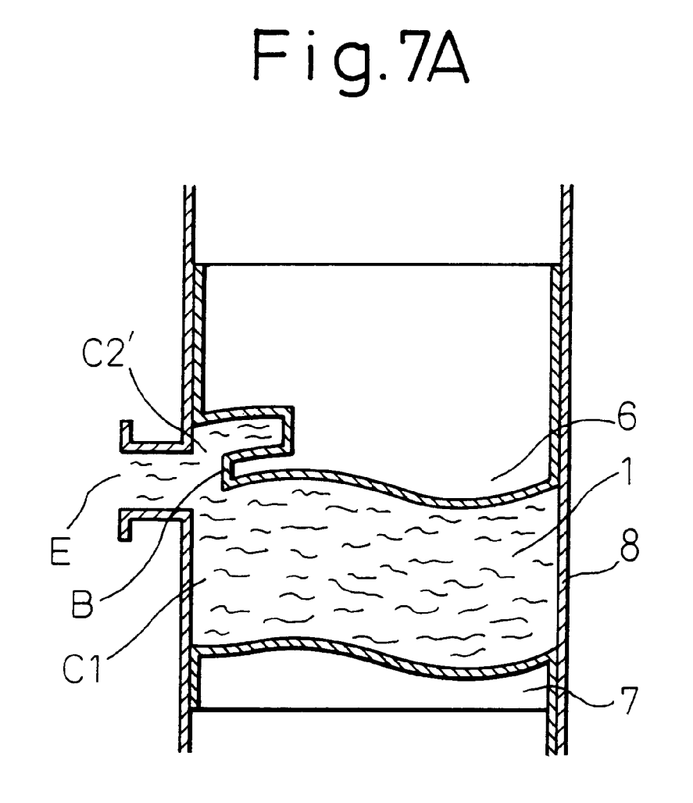
FIG. 7A illustrates a state of the mold cavity prior to the compression.

The present invention described below is characterized in that, as shown in FIGS. 6A, 7A, BA and 9A, the unit filling spaces C1, C1', C2 and/or C2' are arranged in the direction generally vertical to the air-blowing direction in a multi-stage manner in parallel to each other. Typically, the present invention is applied to the cushion member 20 having the upper pouched structure F shown in FIGS. 1A to 1C. In this case, two filling spaces consists of C1 or C1' and C2 or C2', as already described. These two unit filling spaces and the pair of upright wall portions D on both sides of the mold cavity C described with reference to FIGS. 8A and 5B are combined with each other to shape the pouched structure F formed in the upper portion of the cushion member 20.

As illustrated in FIG. 6A, the contact sections W1 to W4 defined by the contact of molds 6 to 8 with the fiber mixture 1 are individually or groupingly movable in the direction vertical to the air-blowing direction. Accordingly, the fiber mixture 1 filled in the respective unit filling spaces is compressed to desirable compression ratios, respectively, by the freely movable contact sections W1 to W4.

Further, there is a preferable aspect in that the molding air stream blowing into the mold cavity is reversed as shown by arrows in FIGS. 6A and 6C so that the unevenness in heat treatment is eliminated. This is because the fiber mixture 1 filled in the mold cavity C is effectively heated or cooled from the both sides compared with a case wherein the molding air stream flow solely in one direction to eliminate the irregularity caused by the heat treatment.

The switching of the flowing direction of the molding air stream is carried out by changing the operation from a state shown in FIG. 6B wherein the molding air stream is generated by the blower/exhauster 10 and exhausted from the blower/exhauster 11 to a state shown in FIG. 6C wherein the molding air stream is generated by the blower/exhauster 11 and exhausted from the blower/exhauster 10 shown in FIG. 6C. In such a manner, the direction of the molding air stream passing through the mold cavity C is switched from an upward direction as shown by an arrow in FIG. 6B to a downward direction as shown by an arrow in FIG. 6C. Accompanied thereby, an inlet and an outlet are substantially reversed in a flow path for the molding air stream in the fiber mixture 1.

Figure 7B:
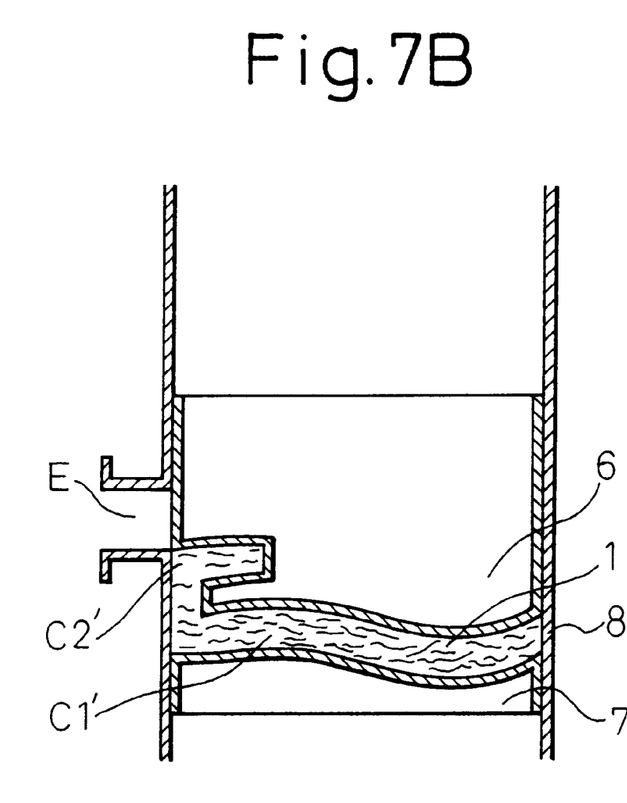
FIG. 7B illustrates a state thereof after the compression.

It will be briefly explained below why the method and apparatus shown in FIGS. 6A to 6C are employed in the present invention for molding a cushion member 20 having a complicated configuration. In the prior art method shown in FIGS. 7A and 7B, when the fiber mixture 1 filled as shown in FIG. 7A is compressed to a state shown in FIG. 7B, it is possible to compress the unit filling space C1 in the upward/downward direction to be the unit filling space C1'. However, the unit filling space C2' apparently could not be compressed. This means that it is impossible to freely control the bulk density of the fiber mixture 1 in the unit filling space C2'. This also means that a high quality mold product is not obtainable if it has a complicated configuration, such as a cushion member having a pouched structure, because the bulk density thereof is not adjustable.

To solve the above problem, according to the first embodiment of the present invention, the fiber mixture 1 is preferentially filled in the unit filling space C1 as shown in FIG. 8A. It is important that the air-blowing inlet E for the fiber mixture 1 must be located at a position capable of selectively supplying the fiber mixture 1 into the unit filling space C1. This is because it is possible thereby to fill the fiber mixture 1 accompanied by the transportation air stream into the respective unit filling space through the air-blowing inlet E. In this regard, it should be noted that the unit filling space C2' in FIG. 8A is not yet supplied with the fiber mixture 1 at this time.

After the unit filling space C1 has selectively been fully supplied with the fiber mixture 1 as described above, the upper mold 6a moves downward as shown in FIG. 8B to displace the contact section W3 or W4 in the direction for compressing the fiber mixture 1. Thereby, the unit filling space C1 is compressed to be the unit filling space C1' shown in FIG. 8B. It is possible to control the bulk density of the fiber mixture 1 filled in the unit filling space C1 to a desired value irrespective of the unit filling space C2' but solely by the unit filling space C1. Of course, the compression ratio should be properly selected in accordance with desired properties of the resultant product.

Next, as shown in FIG. 8B, the air-blowing inlet E is automatically located at a center of the widened unit filling space C2 as the upper mold 6a moves. Thereby, it is possible to fill the fiber mixture 1 in the unit filling space C2. At that time, the communication of the unit filling space C1' to the air-blowing inlet E is disconnected. As a result, the fiber mixture 1 is not yet supplied to the unit filling space C1'. Instead, thigh unit filling space C2 having a capacity for setting the bulk density of the fiber mixture 1 at a desired value is present as the upper mold 6a moves. It is important at this time to take care that the displacement of the upper mold 6b does not occur, otherwise the contact section W1 is displaced. The fiber mixture 1 is supplied from the air-blowing inlet E to the unit filling space C2 formed in such a state and fills the same.

Figure 8C:
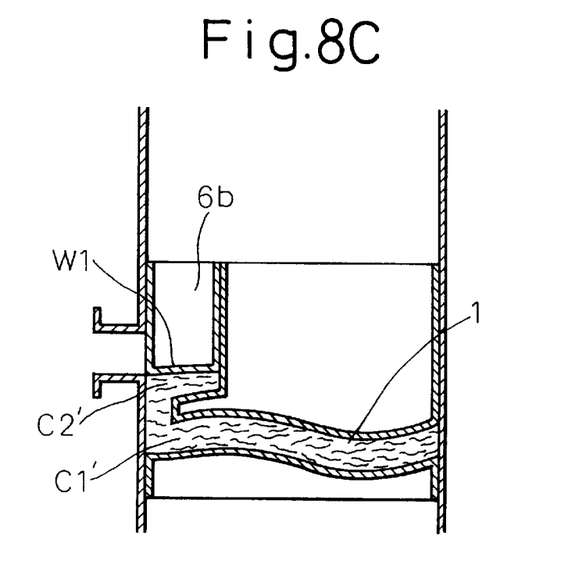
FIG. 8C illustrates a final step wherein the filling steps have all been completed and the fiber mixture has been compressed to have a desirable bulk density as a whole.

Thereafter, as shown in FIG. 8C, the upper mold 6b is displaced to compress the unit filling space C2 to be C2' so that the bulk density of the fiber mixture 1 in the space C2' is controlled to a desired value. In this state, the fiber mixture 1 is thermally molded to be the cushion member 20 having the pouched structure.

The filling of the fiber mixture 1 into the unit filling space may be carried out by a method shown in FIGS. 9A to 9C besides the above-mentioned one, which will be described below in more detail.

Figure 9A:
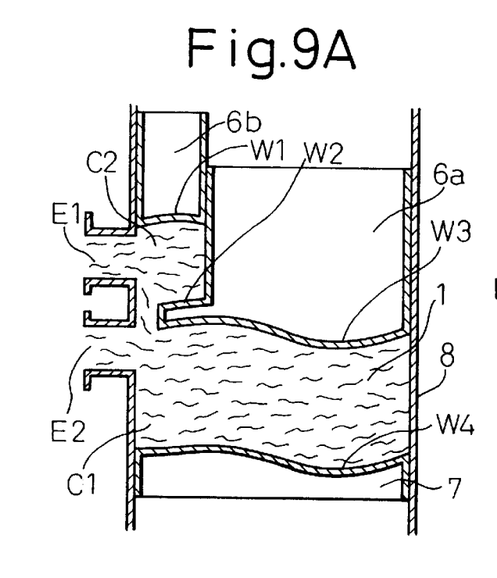
FIG. 9A illustrates an aspect having a plurality of inlets for the fiber mixture.

In FIG. 9A, a plurality of air-blowing inlets E1 and E2 are provided in correspondence with unit filling spaces C1 and C2, respectively, which is the difference from the system shown in FIGS. 8A to 8C. Due to this structure, there is an advantage in this embodiment in that the fiber mixture 1 can be simultaneously supplied to the plurality of unit filling spaces C1 and C2.

Figure 9B:
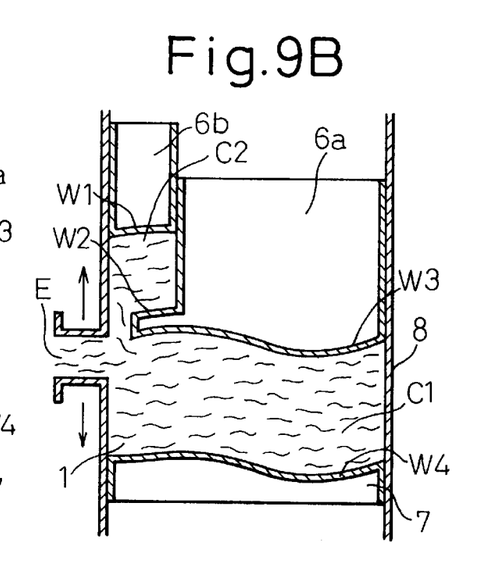
FIG. 9B illustrates another aspect wherein an inlet for the fiber mixture is movable in the arrowed directions.

In FIG. 9B, a side mold 8 is movable in the arrowed direction vertical to the direction for blowing the fiber mixture 1 so that an air-blowing inlet E can confront each of a plurality of unit filling spaces C1 and C2. Thereby, it is possible to sequentially fill the respective unit filling spaces C1 and C2 through the air-blowing inlet E.

Figure 9C:
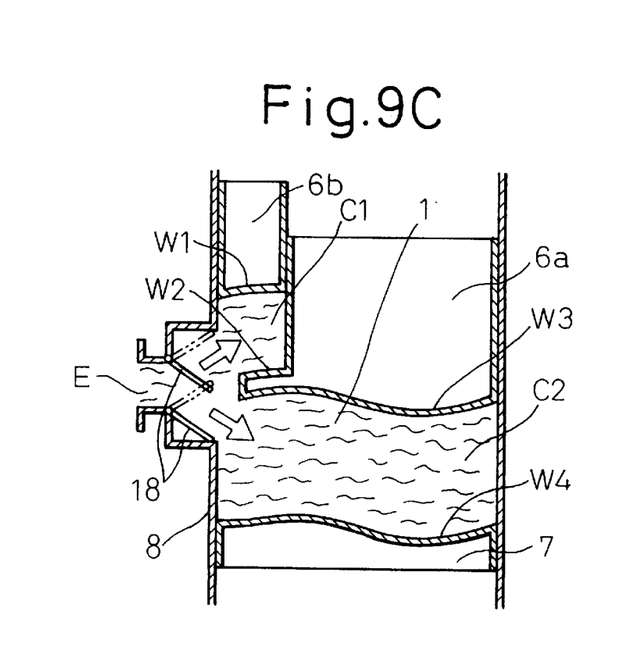
FIG. 9C illustrates a further aspect wherein an inlet for the fiber mixture is capable of changing its direction in the arrowed directions.

Finally, in FIG. 9C, the fiber mixture 1 is sequentially filled in the unit filling spaces C1 and C2 by changing the blowing direction of the air-blowing inlet E in accordance with the switch motion of a deflection plate 18 in the arrowed direction.

According to the present invention described above, it is possible to easily change the behaviour of an air stream via divided contact sections to be suitable, respectively, for the filling process in which the fiber mixture is transported by a transportation air stream and for the heat-treatment process in which it is necessary to quickly and uniformly exchange heat relative to the fiber mixture by a molding air stream. The divided contact sections are movable in the direction for compressing the fiber mixture, whereby no filling unevenness generates even in a cushion member having a complicated three-dimensional configuration such as a pouched structure and a molding time can be shortened. In addition, no heat-treatment irregularity occurs even though the molding time is shortened, whereby a cushion member is industrially obtainable, which is excellent in mass-productivity, cost-saving and quality.

What is claimed is:

1. A method for molding a cushion member from a fiber mixture by a filling process comprising filling a fiber mixture composed of synthetic matrix fibers and binder fibers dispersed therein into a mold cavity of an air-permeable mold by a transportation air stream and a heat-treatment process comprising making a molding air stream for heating and/or cooling the fiber mixture filled in the mold cavity to pass through the fiber mixture, wherein a contact surface of the mold with the fiber mixture is divided into a plurality of contact sections, and a flow rate and/or pressure of an air stream passing through each of the contact sections are regulated to a predetermined condition so that the air stream in the mold cavity is differently controlled in the filling process and the heat-treatment process.

2. A method for molding a cushion member from a fiber mixture as defined by claim 1, wherein the air stream passing through the contact section is controlled by air-intake and exhaust so that the flow rate and/or pressure of the air stream passing through the contact section correspond to the predetermined condition.

3. A method for molding a cushion member from a fiber mixture as defined by claim 1 or 2, wherein the transportation air stream is controlled in the filling process so that the flow rate of the air streampassing through the contact section defining the mold cavity into which the fiber mixture is difficult to fill is selectively larger than in the other contact section.

4. A method for molding a cushion member from a fiber mixture as defined by claim 1 or 2, wherein the flow rate of the molding air stream is controlled in the heat-treatment process so that the molding air stream passes through substantially all of the contact sections.

5. A method for molding a cushion member from a fiber mixture as defined by claim 1, wherein the direction of the transportation air stream for supplying the fiber mixture into the mold cavity in the filling process is generally vertical to the direction of the molding air stream blowing into the mold cavity in the heat-treatment process.

6. A method for molding a cushion member from a fiber mixture as defined by claim 1 or 5, wherein the direction of the molding air stream blowing into the mold cavity is reversed during the heat-treatment process.

7. A method for molding a cushion member from a fiber mixture as defined by claim 1, wherein the contact section disposed on the lateral side of the fiber mixture filled in the mold cavity is displaced in the lateral direction to compress the filled fiber mixture from the lateral side so that a predetermined bulk density of the fiber mixture is obtained.

8. A method for molding a cushion member from a fiber mixture as defined by claim 1 or 7, wherein a plurality of unit filling spaces are arranged in parallel to each other in a multi-stage manner to define the mold cavity; the unit filling space being a space to be filled with the fiber mixture and extending in the direction for supplying the fiber mixture; and wherein the contact sections are displaced in the direction generally vertical to the direction for supplying the fiber mixture into the mold cavity so that the bulk density of the fiber mixture filled in the respective unit filling space is individually controllable.

9. An apparatus for molding a cushion member from a fiber mixture composed of synthetic matrix fibers and binder fibers dispersed therein, comprising a mold to be filled with the fiber mixture transported by a transportation air stream, wherein the mold has a contact surface to be in contact with the fiber mixture filled therein; the contact surface being divided into a plurality mold walls, a means is provided in the mold wall, for controlling a flow rate and/or pressure of an air stream passing through the mold wall to a predetermined condition.

10. An apparatus for molding a cushion member from a fiber mixture as defined by claim 9, wherein the direction of the transportation air stream for supplying the fiber mixture into the mold cavity in the filling process is generally vertical to the direction of the molding air stream blowing into the mold cavity in the heat-treatment process.

11. An apparatus for molding a cushion member from a fiber mixture as defined by claim 9 or 10, wherein the mold walls are individually or groupingly movable in the direction for compressing the fiber mixture.

12. An apparatus for molding a cushion member from a fiber mixture as defined by claim 11, wherein each of the movable mold walls is movable solely in the one-dimensional direction; the upward/downward direction, the forward/backward direction or the leftward/rightward direction.

* * * * *